(12) United States Patent
Marino et al.

(10) Patent No.: US 12,099,463 B2
(45) Date of Patent: Sep. 24, 2024

(54) HIERARCHICAL RING-BASED INTERCONNECTION NETWORK FOR SYMMETRIC MULTIPROCESSORS

(71) Applicant: International Business Machines Corporation, Armonk, NY (US)

(72) Inventors: Charles F. Marino, Round Rock, TX (US); William J. Starke, Round Rock, TX (US); Praveen S. Reddy, Austin, TX (US); John T. Hollaway, Jr., Austin, TX (US); Daniel C. Howe, Pflugerville, TX (US); David J. Krolak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 18/067,790

(22) Filed: Dec. 19, 2022

(65) Prior Publication Data

US 2023/0118362 A1    Apr. 20, 2023

Related U.S. Application Data

(63) Continuation of application No. 17/446,422, filed on Aug. 30, 2021, now Pat. No. 11,580,058.

(51) Int. Cl.
*G06F 15/80* (2006.01)
*G06F 13/36* (2006.01)

(52) U.S. Cl.
CPC .......... *G06F 15/8015* (2013.01); *G06F 13/36* (2013.01)

(58) Field of Classification Search
None
See application file for complete search history.

(56) References Cited

U.S. PATENT DOCUMENTS

| 4,907,224 A | 3/1990 | Scoles |
| 5,131,085 A | 7/1992 | Eikill |

(Continued)

FOREIGN PATENT DOCUMENTS

| EP | 0465027 A2 | 1/1992 |
| WO | 9103898 A1 | 3/1991 |

OTHER PUBLICATIONS

PCT/EP2022/073700 Notification of Transmittal of International Search Report and the Written Opinion of the International Searching Authority or the Declaration. Mailed Feb. 2, 2023. 23 pgs.

(Continued)

*Primary Examiner* — Eric Coleman
(74) *Attorney, Agent, or Firm* — Eric W. Chesley

(57) ABSTRACT

A symmetric multiprocessor includes with a hierarchical ring-based interconnection network is disclosed. The symmetric processor includes a plurality of buses comprised on the symmetric multiprocessor, wherein each of the buses are configured in a circular topology. The symmetric multiprocessor also includes a plurality of multi-processing nodes interconnected by the buses to make a hierarchical ring-based interconnection network for conveying commands between the multi-processing nodes. The interconnection network includes a command network configured to transport commands based on command tokens, wherein the tokens dictate a destination of the command, a partial response network configured to transport partial responses generated by the multi-processing nodes, and a combined response network configured to combine the partial responses generated by the multi-processing nodes using combined response tokens.

10 Claims, 11 Drawing Sheets

(56) References Cited

U.S. PATENT DOCUMENTS

| | | | |
|---|---|---|---|
| 5,185,737 A | 2/1993 | Nassehi | |
| 5,908,468 A | 6/1999 | Hartmann | |
| 5,953,510 A | 9/1999 | Herzl | |
| 6,516,368 B1* | 2/2003 | Arimilli | G06F 12/0831 710/110 |
| 6,848,003 B1 | 1/2005 | Arimilli | |
| 7,493,417 B2 | 2/2009 | Arimilli | |
| 7,627,738 B2 | 12/2009 | Chung | |
| 7,650,076 B2 | 1/2010 | Su | |
| 7,747,771 B1 | 6/2010 | Shah | |
| 7,751,426 B2 | 7/2010 | Hillyard | |
| 7,870,337 B2 | 1/2011 | Bell, Jr. | |
| 8,560,776 B2 | 10/2013 | Drapala | |
| 9,178,827 B2 | 11/2015 | Kaplan | |
| 9,665,294 B2 | 5/2017 | Povzner | |
| 9,979,668 B2 | 5/2018 | Chen | |
| 10,496,333 B2 | 12/2019 | Yang | |
| 10,705,985 B1* | 7/2020 | Pollak | G06F 13/1673 |
| 10,764,185 B2 | 9/2020 | Marshall et al. | |
| 10,855,389 B1 | 12/2020 | Roggendorf | |
| 11,593,134 B2* | 2/2023 | Wang | G06F 9/5027 |
| 2003/0033555 A1* | 2/2003 | Joyner | G06F 11/2007 714/E11.078 |
| 2003/0202530 A1 | 10/2003 | Jenkins | |
| 2003/0212812 A1 | 11/2003 | Wang | |
| 2004/0210696 A1* | 10/2004 | Meyer | G06F 13/37 710/240 |
| 2004/0230751 A1 | 11/2004 | Blake | |
| 2005/0080941 A1 | 4/2005 | Moll | |
| 2006/0045120 A1 | 3/2006 | Mattina | |
| 2006/0104296 A1 | 5/2006 | Rodrigo | |
| 2007/0297441 A1 | 12/2007 | Heil | |
| 2008/0104245 A1 | 5/2008 | Romero | |
| 2008/0159176 A1 | 7/2008 | Heil | |
| 2009/0067428 A1 | 3/2009 | Balandin | |
| 2009/0252172 A1 | 10/2009 | Hare | |
| 2010/0299734 A1 | 11/2010 | Lynch | |
| 2012/0030448 A1 | 2/2012 | Lieske | |
| 2012/0089984 A1 | 4/2012 | Adar | |
| 2012/0102561 A1 | 4/2012 | Butt | |
| 2012/0159087 A1* | 6/2012 | Cox | G06F 12/0833 711/146 |
| 2014/0082238 A1 | 3/2014 | Ahmad | |
| 2014/0185451 A1* | 7/2014 | Yip | H04L 47/60 370/236 |
| 2014/0233575 A1 | 8/2014 | Xie | |
| 2014/0280700 A1 | 9/2014 | Maitland | |
| 2014/0372646 A1* | 12/2014 | Salisbury | G06F 13/37 710/110 |
| 2015/0255126 A1 | 9/2015 | Khwa | |
| 2016/0070593 A1 | 3/2016 | Harris | |
| 2018/0324827 A1 | 11/2018 | Abraham | |
| 2019/0018776 A1 | 1/2019 | Sato | |
| 2019/0042486 A1 | 2/2019 | Guthrie | |
| 2020/0042449 A1* | 2/2020 | Marino | G06F 9/4881 |
| 2020/0279250 A1 | 9/2020 | Good | |
| 2020/0296083 A1 | 9/2020 | Chennuri | |
| 2021/0037544 A1 | 2/2021 | Andrews | |
| 2022/0308877 A1* | 9/2022 | Maiyuran | G06F 12/0842 |
| 2022/0342542 A1 | 10/2022 | Alkalay | |

OTHER PUBLICATIONS

Bianchi, Giuseppe & Bonola, Marco & Bruschi, Valerio & Petrucci, Luca & Pontarelli, S.. (2017). Implementing a Per-Flow Token Bucket Using Open Packet Processor. 251-262. 10.1007/978-3-319-67639-5_18, https://www.researchgate.net/publication/319489224_Implementing_a_Per-Flow_Token_Bucket_Using_Open_Packet_Processor.

Chakrabarti, Ayan, Roch Gu'erin, Chenyang Lu and Jiangnan Liu. "Real-Time Edge Classification: Optimal Offloading under Token Bucket Constraints." ArXiv abs/2010.13737 (2020): n. pag., https://arxiv.org/abs/2010.13737.

Cotè, E. A., & Manjikian, N. (2007). Implementation of coarse-grain coherence tracking support in ring-based multiprocessors. A thesis submitted to the Department of Electrical and Computer Engineering, Queen's University.

Disclosed Anonymously, "Fairness circuit for automic read-modify-write operations on multiprocessor systems," IP.com Electronic Publication Date: Nov. 6, 2018, IP.com Electronic Publication Date: Nov. 6, 2018, https://ip.com/IPCOM/000256121.

Disclosed Anonymously, "Reserved slots in PowerBus attached units for off-chip traffic to reduce link congestion due to retries," IP.com Electronic Publication Date: Jan. 30, 2015, IP.com No. IPCOM000240448D, https://priorart.ip.com/IPCOM/000240448.

Eynde, Jeremy Van Den. "Token Bucket-Based Throughput Constraining in Cross-Layer Schedulers." ArXiv.Org, Nov. 27, 2019, arxiv.org/abs/1911.12079.

Itamar Elhanany and Dan Sadot, A Contention-Free Tbit/sec Packet-Switching Architecture for ATM over WDM Networks, IEICE Trans. Commun., vol. E83-B, No. 2 Feb. 2000, https://www.researchgate.net/publication/2824295_A_Contention-Free_Tbitsec_Packet-Switching_Architecture_for_ATM_over_WDM_Networks.

Li, F.. "Local and Global QoS-aware Token Bucket Parameters Determination for Traffic Conditioning in 3rd Generation Wireless Networks." (2002), http://citeseerx.ist.psu.edu/viewdoc/summary?doi=10.1.1.385.8754.

List of IBM Patents or Patent Applications Treated as Related (Signed 2022) 2 pgs.

M. Hamdi, "ORMA: a high-performance MAC protocol for fiber-optic LANs/MANs," in IEEE Communications Magazine, vol. 35, No. 3, pp. 110-119, Mar. 1997, doi: 10.1109/35.581315.

Marty, M. R., & Hill, M. D. (Dec. 2006). Coherence ordering for ring-based chip multiprocessors. In 2006 39th Annual IEEE/ACM International Symposium on Microarchitecture (MICRO'06) (pp. 309-320). IEEE.

Orlando Moreira, Jacob Jan-David Mol, and Marco Bekooij. 2007. Online resource management in a multiprocessor with a network-on-chip. In <i>Proceedings of the 2007 ACM symposium on Applied computing</i> (<i>SAC '07</i>). Association for Computing Machinery, New York, NY, USA, 1557-1564. DOI:https://doi.org/10.1145/1244002.1244335.

PCT/EP2022/073698. International Search Report and Written Opinion mailed Nov. 9, 2022.

Vranesic, Z. G., Brown, S., Stumm, M., Caranci, S., Grbic, A., Grindley, R., . . . & Srbljic, S. (1995). The NUMAchine multiprocessor. University of Toronto. Computer Systems Research Institute.

Y. Peng, Q. Liu and P. Varman, "Scalable QoS for Distributed Storage Clusters using Dynamic Token Allocation," 2019 35th Symposium on Mass Storage Systems and Technologies (MSST), 2019, pp. 14-27, doi: 10.1109/MSST.2019.00-19, https://ieeexplore.ieee.org/document/8890120.

PCT/EP2022/073700 Form PC/ISA/206—Annex to Form PCT/ISA/206 Communication Relating to the Results of the Partial International Search. Mailed Nov. 30, 2022. 14 pages.

U.S. Appl. No. 17/446,427—Notice of References Cited, mailed Feb. 29, 2024 1 pg.

* cited by examiner

HIERARCHICAL RING-BASED INTERCONNECTION NETWORK FOR SYMMETRIC MULTIPROCESSORS

BACKGROUND

The present disclosure relates to computer technology, and more specifically, to a hierarchical ring-based interconnection network of symmetric multi-processing (SMP) nodes used to deliver data throughout a symmetric multiprocessor.

Modern symmetric multiprocessors connect a large number of processing cores using an interconnection network to convey commands and responses between the processing cores. Interconnection networks can be categorized according to their topology, routing strategy, and switching technique. The network topology, the way in which the components are interconnected, is a major determining factor in the overhead cost of message passing. Accordingly, network designs attempt to minimize both the number of messages required and the distances over which they must travel.

SUMMARY

Embodiments of the present disclosure include a symmetric multiprocessor with a hierarchical ring-based interconnection network. The symmetric processor includes a plurality of buses comprised on the symmetric multiprocessor, wherein each of the buses is configured in a circular topology. The symmetric multiprocessor also includes a plurality of multi-processing nodes interconnected by the buses to make a hierarchical ring-based interconnection network for conveying commands between the multi-processing nodes. The interconnection network includes a command network configured to transport commands based on command tokens, wherein the tokens dictate a destination of the command, a partial response network configured to transport partial responses generated by the multi-processing nodes, and a combined response network configured to combine the partial responses generated by the multi-processing nodes using combined response tokens.

Additional embodiments include a symmetric multi-processing node comprising a coherency command network. The coherency command network includes a plurality of buses comprised on the multi-processing node. Each of the buses is configured in a circular topology, including a command ring bus, a control ring bus, and a token ring bus. The coherency command network also includes a plurality of communication ports comprised on the multi-processing node. Each of the communication ports is coupled to one or more of the buses and operable to route data from a source node to a destination node. The coherency command network further includes a plurality of node station agents. One or more of the node station agents is coupled to at least one of the communication ports, and the node station agents are operable to communicate with each other through one or more of the buses. The coherency command network also includes a token dispenser agent comprised on the multi-processing node and coupled to one or more of the buses and operable to distribute different types of tokens to allow communication on different tiers.

Further embodiments include a symmetric multi-processing node including a partial response network. The partial response network includes a plurality of buses comprised on the multi-processing node. Each of the buses is configured in a circular topology, including a local partial response ring bus and a remote partial response ring bus. The partial response network also includes a plurality of communication ports comprised on the multi-processing node. Each of the communication ports is coupled to one or more of the buses and operable to route data from a source bus to a destination bus. The partial response network further includes a plurality of processing nodes. One or more of the node station agents is coupled to at least one of the communication ports, and the node station agents are operable to communicate with each other through one or more of the buses. The partial response network also includes partial response queues located within the communication ports for collecting responses from the node station agents.

Further embodiments include a symmetric multi-processing node including a combined response network. The combined response network includes a plurality of buses comprised on the multi-processing node. Each of the buses is configured in a circular topology, including a combined response ring bus, a control ring bus, and a token ring bus. The combined response network also includes a plurality of communication ports comprised on the multi-processing node. Each of the communication ports is coupled to one or more of the buses and operable to route data from a source node to a destination node. The combined response network further includes a plurality of node station agents. One or more of the node station agents is coupled to at least one of the communication ports, the node station agents are operable to communicate with each other through one or more of the buses. The combined response network further includes a response token dispenser agent comprised on the multi-processing node and coupled to one or more of the buses and operable to distribute different types of tokens to allow communication on different tiers. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
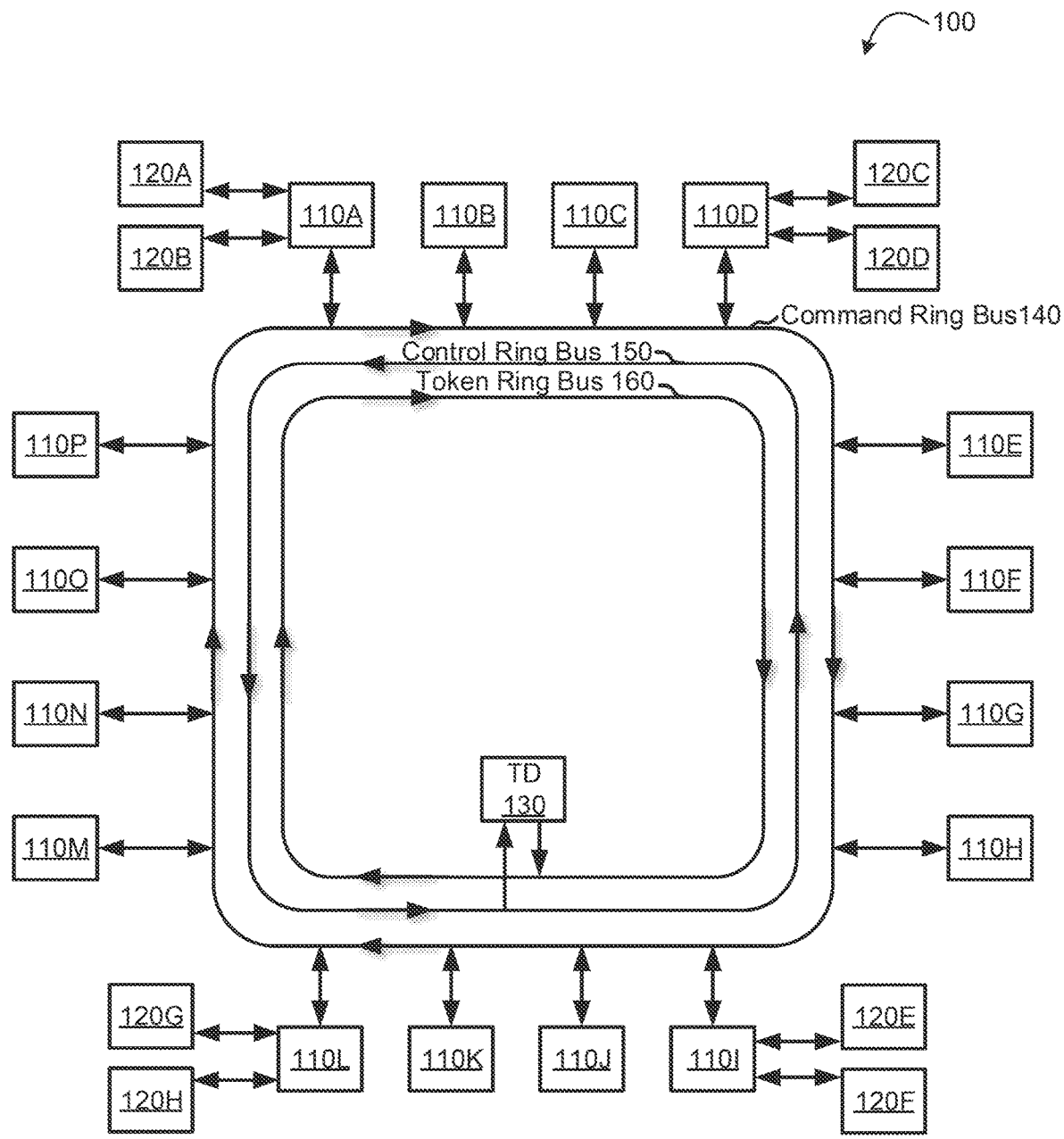
FIG. 1 is a block diagram illustrating a coherency command network of a multi-processing node and used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to computer technology, and more specifically, to a hierarchical ring-based interconnection network of symmetric multi-processing (SMP) nodes used to deliver data throughout a symmetric multiprocessor. While the present disclosure is not necessarily limited to such applications, various aspects of the disclosure may be appreciated through a discussion of various examples using this context.

Modern symmetric multiprocessors connect a large number of processing cores to perform calculations. Communication between the processing cores is essential for synchronized processing and data sharing. The manner in which messages are passed among system components determines the overall design of a multiprocessor. For example, a multiprocessor can use shared memory or be designed as an interconnection network model. Shared memory systems have one large memory that is accessed identically by all processors. In interconnected systems, each processor can have its own memory, and the processors are permitted to access other processors' memories via the interconnection network.

Interconnection networks are often categorized according to their topology, routing strategy, and switching technique. The network topology, the way in which the components are interconnected, is a determining factor in the overhead cost of message passing. Message passing efficiency can be limited by the bandwidth, message latency, transport latency, and overhead required for transmission.

Additionally, interconnection networks can be static or dynamic. Dynamic interconnection networks allow the path between two entities (e.g., a processor or memory) to change from one communication to the next. Static networks do not allow paths to change. Static interconnection networks are typically used for message passing between processors. Dynamic interconnection networks are typically used for message passing between processors and memory.

Interconnection networks can also be a completely connected network where all components are connected to all other components. These networks include, for example, topologies such as star-connected networks, linear array networks, ring networks, and mesh networks. Ring networks allow an entity to communicate with its neighbors directly. Other communication has to go through multiple entities to arrive at its destination.

Limitations remain, however, on symmetric multiprocessors with interconnection networks. Depending on the network topology chosen, the speed, cost, reliability, configuration, and complexity of the network may have an impact on the symmetric multiprocessor. For example, A bus-based network may suffer from bottlenecks if too many processors make memory requests simultaneously. Parallel buses can alleviate bottlenecks, but the cost of implementing those buses can be considerable, and the complexity of the architecture may become too burdensome.

Embodiments of the present disclosure may overcome the above, and other problems, by applying a hierarchical ring-based interconnection network on a symmetric multiprocessor. The ring-based interconnection network provides the system with an address/command network, a partial response network, and a combined response network that are paths of communication on the symmetric processor. The interconnection network combines groups of processing nodes in a ring topology with additional interconnect links between the groups.

Additionally, the interconnection network provides support for multiple scopes in which to broadcast commands. For example, a command may remain localized on a processing node, a command can be broadcast within a group of processing nodes, or the command can be broadcast to the entire network. Commands from a node station agent being placed on the network are controlled by tokens provided by a token dispenser located on each processing node. The token selected by the node station agent can dictate the scope of the command. For example, there are local tokens for local broadcasts, group tokens for broadcasts to the group of processing nodes, and system tokens for broadcasts to the entire network.

Embodiments of the present disclosure provide an interconnection network for issuing commands between multi-processing nodes interconnected on the network. A node station agent coupled with a multi-processing node can issue a command. In order to issue the command, the node station agent first obtains a token of the scope the agent wishes to broadcast the command. The node station agent can then issue the command and is broadcasted in the scope of the token obtained. Other node station agents within that scope can snoop the command and issue partial responses to the command. The multi-processing node containing the node station agent that issued the command can use a combined response network to generate a combined response by compiling the partial responses issued by the other node station agents. The combined response can then be transmitted to the node station agent that participated in the command.

In some embodiments, the interconnection network includes symmetric multi-processing nodes having a command network configured to transport coherency commands. The command network can include a plurality of buses comprised on a multi-processing node. Each of the buses is configured in a circular topology, including a command ring bus, a control ring bus, and a token ring bus. The command network also includes a plurality of communication ports comprised on the multi-processing node. Each of the communication ports is coupled to one or more of the buses and operable to route data from a source node to a destination node. The command network also includes a plurality of node station agents. One or more of the node station agents is coupled to at least one of communication ports. The node station agents are operable to communicate with each other through one or more of the buses. The command network also includes a token dispenser agent comprised on the multi-processing node and coupled to one or more of the buses and operable to distribute different types of tokens that determine the scope of the command.

In some embodiments, the token dispenser agent distributes tokens onto the token ring bus based on a percentage of different types of tokens currently on the token ring bus. Additionally, the token dispenser agent places link tokens onto the token ring bus to allow off-ring traffic to enter the multi-processing node. The different types of tokens also include a local token that allows for localized communication on the node, a group token allowing for communications within a group of nodes, and a system token allowing for communication with any node within a system of nodes. By managing the different tokens based on a percentage, the token dispenser agent can regulate on-ring traffic versus off-ring traffic.

In some embodiments, the control ring bus transport traffic in an opposite direction of the command ring bus. The control ring bus can also provide counters for the different types of tokens allowing the token dispenser agent to distribute the tokens based on a percentage of different tokens on the token ring bus. Additionally, node station agents on the control ring can analyze the control ring when issuing commands. When a node station agent needs to issue a command of a certain type (e.g., node, group, system, link) onto the command ring bus, the node station agent provides an indication of the command by incrementing the counter for that type of class. For example, if the node station agent wants to issue a command within the node, then the node counter would be incremented, and so forth.

In some embodiments, node station agents, when issuing a command, analyze the control ring bus for the class of command it issued. The node station agent will wait for that many commands of that type from upstream station agents to pass the agent before that agent may issue another command of the same type. For example, a node station agent issues a group command onto the command ring bus using a command token. Prior to sending another group command, that node station agent can analyze the token ring bus for the number of group tokens on the token ring bus. When that many commands from upstream node station agents pass through that node station agent, then it can issue another group command.

In some embodiments, the token dispenser agent manages the available tokens on the token ring bus by resetting the counts of the different types of tokens on the ring. Additionally, the token dispenser agent can dynamically adjust the mixture of available tokens to optimize the performance of the symmetric multiprocessor based on the number of successful commands of each type of scope. For example, if there is an increase of successful group commands, then the token dispenser agent can allocate additional group tokens onto the token ring bus.

In some embodiments, the token dispenser agent provides golden tokens. In order to prevent starvation on a node station agent, a golden token can be issued that allows a particular agent to issue a command. At a regular interval, the token dispenser agent can empty the token ring bus to ensure that the node station agent with the golden token is able to issue a command when the golden token arrives. Once the token ring bus is emptied of tokens, the token dispenser agent can issue the golden token to the node station agent to allow them to issue their command. This process can proceed around the ring, clearing the token ring bus each time and handing a golden token to each node station agent on the multi-processing node. In that way, each agent has ensured the opportunity to get at least some minimal flow of traffic through the interconnection network.

In some embodiments, the interconnection network includes symmetric multi-processing nodes having a partial response network for transporting partial responses on the interconnection network. The partial response network includes a plurality of buses comprised on the multi-processing node. Each of the buses is configured in a circular topology, including a local partial response ring bus and a remote partial response ring bus. The partial response network also includes a plurality of communication ports comprised on the multi-processing node. Each of the communication ports is coupled to one or more of the buses and operable to route data from a source bus to a destination bus. The partial response network further includes a plurality of processing nodes. One or more of the node station agents is coupled to at least one of the communication ports. The node station agents are operable to communicate with each other through one or more of the buses. The partial response network also includes partial response queues located within the communication ports for collecting responses from the node station agents.

In some embodiments, the local and remote partial response ring buses allow the node station agents to snoop for issued commands. The snooping can look for commands to the multi-processing node of the appropriate scope. For example, a command may be snooped with a group scope. If the multi-processing node is within that group, then the node station agents can provide partial responses in response to the command. The remote partial response ring bus can be used to transport the partial responses to the communication ports so that they can be transported back to the originating node station agent that issued the command.

In some embodiments, the interconnection network includes symmetric multi-processing nodes having a combined response network for gathering partial responses from the interconnection network. The combined response network includes a plurality of buses comprised on the multi-processing node. Each of the buses is configured in a circular topology, including a combined response ring bus, a control ring bus, and a token ring bus. The combined response network also includes a plurality of communication ports comprised on the multi-processing node. Each of the communication ports is coupled to one or more of the buses and operable to route data from a source node to a destination node. The combined response network further includes a plurality of node station agents. One or more of the node station agents is coupled to at least one of the communication ports, the node station agents are operable to communicate with each other through one or more of the buses. The combined response network further includes a response token dispenser agent comprised on the multi-processing node and coupled to one or more of the buses and operable to distribute different types of tokens to allow communication on different tiers.

In some embodiments, the response token dispenser agent distributes tokens onto the token ring bus based on a demand provided by a workload vector. For example, if the workload vector has a higher number of group commands, then the response token dispenser agent can allocate more group tokens onto the token ring bus. Additionally, the different types of tokens the response token dispenser agent issues include a group token allowing for communication within a group of nodes and a system token allowing for communication with other nodes within the entire interconnection network.

FIG. 1 illustrates a coherency command network 100 for a multi-processing node configured to manage commands, in accordance with embodiments of the present disclosure. The coherency command network 100 include node station agents 110A-110P, communication ports 120A-120H, a command token dispenser agent 130, a command ring bus 140, a control ring bus 150, and a token ring bus 160. When reference is made to a component and its associated number, such as node station agent 110, that reference may refer to any of the components with that associated number, such as node station agents 110A-110P, with or without an additionally associated letter. The coherency command network 100 is configured in a circular topology interconnecting the node station agents 110 to the command ring bus 140, the control ring bus 150, and the token ring bus 160. The node station agent 110A is coupled to communication ports 120A and 120B. The node station agent 110D is coupled to communication ports 120C and 120D. The node station agent 110I is coupled to communication ports 120E and 120F. The node station agent 110L is coupled to communication ports 120G and 120H. It should be noted that although the embodiment of FIG. 1 includes three buses 140, 150, and 160, a greater number of buses can be included, as desired. Additionally, while only sixteen node station agents 110 are shown, a greater or lesser number of node station agents 110 can also be used.

The node station agents 110 are components of the multi-processing node on the coherency command network 100 configured to perform operations. The node station agents 110 can include, for example, a processor, an I/O controller, memory, or a hybrid of tasks (e.g., task-specific hybrid (ASIC) or task-general hybrid). A processor can be a CPU, FPU, or an I/O controller in any of the variety of possible forms. A memory can be a RAM, ROM, hybrid memory, or active memory in any of the variety of possible forms. Hybrids can be task-specific like an ASIC or task general. Additional details concerning the node station agents 110 can be found below in reference to FIGS. 3 and 4.

The communication ports 120 are components of the multi-processing node on the coherency command network 100 configured to route data from the node station agents 110 to other multi-processing nodes. Each of the communication ports 120A-120H is further coupled to an associated node station agent 110A-110P, which are collectively coupled to the buses 140, 150, and 160 in a circular topology. Other couplings for the communication ports 120 are possible, such as to another module or to additional communication ports on other multi-processing nodes. Additional details concerning the communication ports 120 can be found below in reference to FIG. 8.

The command token dispenser agent 130 is a component of the multi-processing node on the coherency command network 100 configured to supply tokens onto the token ring bus 160. The command token dispenser agent issues different types of tokens that are placed onto the token ring bus 160. The different types of tokens include a node token, a group token, a system token, and a link token.

These tokens provide commands with their propagation scope and the authority to be placed onto the command ring bus 140. Node tokens allow commands to propagate within the multi-processing node. Group tokens allow commands to propagate to other multi-processing nodes in the same group. System tokens allow the command to propagate to an entire interconnected network of multi-processing nodes. For example, a node station agent 110 can obtain a group token off of the token ring bus 160 and issue a command to the group of multi-processing nodes that the current multi-processing node is in. The link tokens allow another node station agent on a cross-ring to initiate a command on the multi-processing node and that came from another multi-processing node. The link tokens allow for off-ring traffic to enter the coherency command network 100.

The command token dispenser agent 130 is further configured to manage the percentage of the different types of tokens on the token ring bus 160. For example, the command token dispenser agent 130 can distribute the tokens onto the token ring bus 160 such that 25% of the tokens are node tokens, 25% of the tokens are group tokens, 25% of the tokens are system tokens, and 25% of the tokens are link tokens. It should be understood that these percentages can differ based on the needs and configuration of the command token dispenser agent 130. The percentage allocations allow the command token dispenser agent 130 to regulate the on-ring versus the off-ring traffic that can occur on the coherency command network 100.

The command token dispenser agent 130 is further configured to dynamically adjust the mixture of available tokens on the token ring bus 160. The command token dispenser agent 130 can adjust the type of available tokens based on which tokens are being taken off of the token ring bus 160. For example, if more group tokens are being taken off of the token ring bus 160, then the command token dispenser agent 130 can allocate more group tokens onto the bus 160 to accommodate for the greater demand.

The command token dispenser agent 130 is further configured to reset the count of available tokens on the token ring bus 160 after the tokens completely propagate around the token ring bus 160. For example, once the command token dispenser agent 130 dispenses the tokens, it waits for the tokens that have not been taken to propagate around the token ring bus 160 before resetting the allocation of tokens on the bus 160. By doing so, the command token dispenser agent 130 ensures that there is a sufficient number of tokens on the token ring bus 160.

The command token dispenser agent 130 is further configured to distribute a golden token. A golden token allows a node station agent 110 to issue a command in order to prevent starvation. At a regular interval, the command token dispenser agent 130 can empty the token ring bus 160 of tokens. Once the ring is emptied of tokens, the command token dispenser agent 130 can issue the golden token to allow a node station agent 110 to issue a command once it obtains the golden token. The command token dispenser agent 130 can then repopulate the token ring bus 160 with the regular types of tokens. The golden ring distribution can proceed to each node station agent 110 in the coherency command network 100. The golden token is distributed to each node station agent 110 until all of the node station agents in the coherency command network 100 have had an opportunity to obtain the golden token. By doing so, the command token dispenser agent 100 provides a mechanism for allowing at least some flow of traffic from each of the node station agents 110. Additional details concerning the command token dispenser agent 130 can be found below in reference to FIG. 2.

The command ring bus 140, the control ring bus 150, and the token ring bus 160 are components of the multi-processing node configured to form parts of the coherency command network 100 utilizing multiple circular topologies for interconnecting the plurality of node station agents 110A-110P on the multi-process node to form an on-chip network. The communications bus 130 is further configured to provide an electrical path for data communications between the plurality of processing nodes 110 comprised on the computer chip 100. It is noted that although the embodiment of FIGS. 1 and 2 include two buses 130 and 140, a greater number of buses may be included, as desired.

The command ring bus 140, the control ring bus 150, and the token ring bus 160 can be unidirectional, that is, only transmitting data in one direction. The buses 140, 150, and 160 can also be configured to transfer data in two directions. The buses 140, 150, and 160 can also include addressing and control lines in addition to data lines. Other special function lines may also be included in buses 140, 150, and 160 as desired. When a node station agent 110 issues a command, it first obtains a token from the token ring bus 160, and then issues the command onto the command ring bus 140. The command can propagate from the command ring bus 140 to its appropriate destination based on the scope authorized by the obtained token.

It is noted that FIG. 1 is intended to depict the major representative components of a coherency command network 100. In some embodiments, however, individual components may have greater or lesser complexity than as represented in FIG. 1, components other than or in addition to those shown in FIG. 1 may be present, and the number, type, and configuration of such components may vary. It should be noted that the components on the coherency command network 100 can be duplicated multiple times (e.g., four times) to provide enough capacity for traffic. Once duplicated, the direction of the buses alternates between the various duplications.

Figure 2:
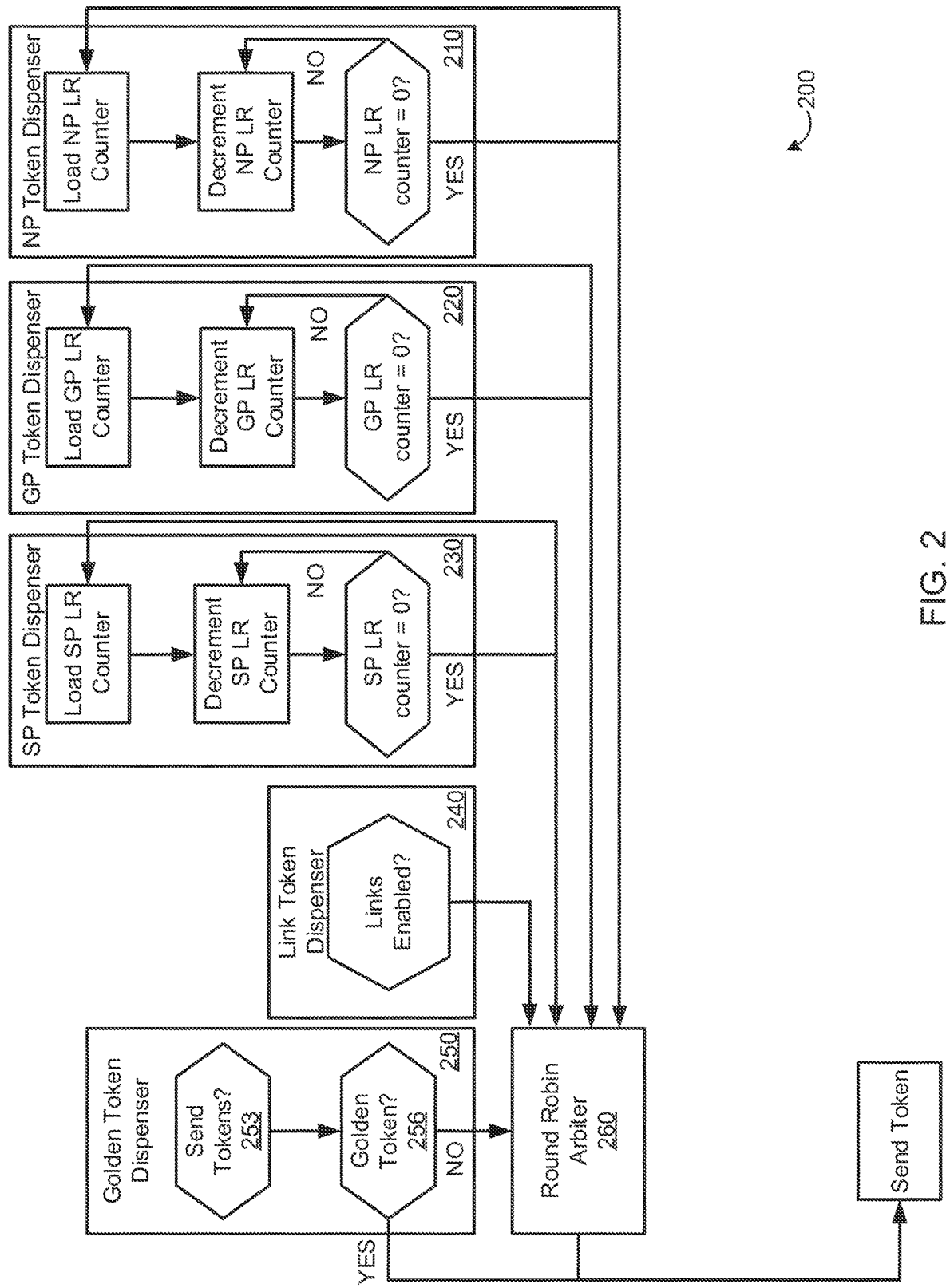
FIG. 2 is a block diagram illustrating a command token dispenser agent and used by one or more embodiments of the present disclosure.

FIG. 2 is a block diagram illustrating a command token dispenser agent 200 (which can be the same as, or substantially similar to, the command token dispenser agent 130 of FIG. 1) configured to allocate tokens onto the token ring bus 160, in accordance with embodiments of the present disclosure. The token dispenser agent 200 includes a node token dispenser 210, a group token dispenser 220, a system token dispenser 230, a link token dispenser 240, a golden token dispenser 250, and a round-robin arbiter 260.

The node token dispenser 210 is a component of the command token dispenser agent 200 configured to dispense a node token to the round-robin arbiter 260. Node tokens allow commands to propagate within the multi-processing node. The node token dispenser 210 loads a node launch rate counter that determines the rate at which a node token is dispensed. The node launch rate counter can be based on the percentage of distribution of tokens on the token ring bus 160. In some embodiments, the command token dispenser agent 200 dynamically changes the node launch rate counter to adjust the frequency of node token distribution. For example, a higher node launch rate counter can decrease the frequency of the node token distribution, whereas a lower node launch rate counter can increase the frequency of the node token distribution.

Once loaded, the node token dispenser 210 can decrement the node token launch rate counter. The node launch rate counter can be analyzed to determine whether or not the node launch rate counter is equal to zero. If the node launch rate counter is not zero, then the node token dispenser 210 can continue to decrement the node launch rate counter at an interval. However, if the node launch rate counter is zero, then the node token dispenser 210 can send a node token to the round-robin arbiter 260. In some embodiments, when the node token dispenser 210 analyzes the node launch rate counter, it also analyzes to see if there are any requests from node station agents 110 for group tokens, system tokens, or link tokens. If there are no requests, then a node token can be sent to the round-robin arbiter 260.

The group token dispenser 220 is a component of the command token dispenser agent 200 configured to dispense a group token to the round-robin arbiter 260. Group tokens allow commands to propagate to other multi-processing nodes in the same group. The group token dispenser 230 loads a group launch rate counter that determines the rate at which a group token is dispensed. The group launch rate counter can be based on the percentage of distribution of tokens on the token ring bus 160. In some embodiments, the command token dispenser agent 200 dynamically changes the group launch rate counter to adjust the frequency of group token distribution. For example, a higher group launch rate counter can decrease the frequency of the group token distribution, whereas a lower group launch rate counter can increase the frequency of the group token distribution.

Once loaded, the group token dispenser 220 can decrement the group token launch rate counter. The group launch rate counter can be analyzed to determine whether or not the group launch rate counter is equal to zero. If the group launch rate counter is not zero, then the group token dispenser 220 can continue to decrement the group launch rate counter at an interval. However, if the group launch rate counter is zero, then the group token dispenser 220 can send a group token to the round-robin arbiter 260. In some embodiments, when the group token dispenser 220 analyzes the group launch rate counter, it also analyzes to see if there are any requests from node station agents 110 for node tokens, system tokens, or link tokens. If there are no requests, then a group token can be sent to the round-robin arbiter 260.

The system token dispenser 230 is a component of the command token dispenser agent 200 configured to dispense a system token to the round-robin arbiter 260. System tokens allow commands to propagate to other multi-processing nodes in an entire interconnection network. The system token dispenser 230 loads a system launch rate counter that determines how a system token is dispensed. The system launch rate counter can be based on the percentage of distribution of tokens on the token ring bus 160. In some embodiments, the command token dispenser agent 200 dynamically changes the system launch rate counter to adjust the frequency of system token distribution. For example, a higher system launch rate counter can decrease the frequency of the system token distribution, whereas a lower system launch rate counter can increase the frequency of the system token distribution.

Once loaded, the system token dispenser 230 can decrement the system token launch rate counter. The system launch rate counter can be analyzed to determine whether or not the system launch rate counter is equal to zero. If the system launch rate counter is not zero, then the system token dispenser 230 can continue to decrement the system launch rate counter at an interval. However, if the group launch rate counter is zero, then the system token dispenser 230 can send a system token to the round-robin arbiter 260. In some embodiments, when the system token dispenser 230 analyzes the system launch rate counter, it also analyzes to see if there are any requests from node station agents 110 for node tokens, group tokens, or link tokens. If there are no requests, then a system token can be sent to the round-robin arbiter 260.

The link token dispenser 240 is a component of the command token dispenser agent 200 configured to dispense a link token to the round-robin arbiter 260. Link tokens allow off-ring traffic to enter the multi-processing node couple to the token dispenser agent 200. The link token dispenser 230 can analyze to see if the command token dispenser agent 200 has enabled link tokens to be distributed. If so, then the link token dispenser 240 can dispense a link token at a predetermined interval to the round-robin arbiter 260.

The golden token dispenser 250 is a component of the command token dispenser agent 200 configured to dispense a golden token to the round-robin arbiter 260. At a regular interval, the token dispenser agent 200 can empty the token ring bus to ensure that the node station agent obtains the golden token is able to issue a command. Once the token ring bus is emptied of tokens, the golden token dispenser 250 can issue the golden token immediately onto the token ring bus 160, bypassing the round-robin arbiter 260. This process can proceed around the ring, clearing the token ring bus each time and handing a golden token to each node station agent 110 on the multi-processing node.

The round-robin arbiter 260 is a component of the command token dispenser agent 200 configured to load tokens onto the token ring bus 160. The round-robin arbiter 260 manages the distribution of tokens onto the token ring bus 130. Based on allocation, need, and configuration, the round-robin arbiter 260 can place additional tokens from the dispensers 210, 220, and 230 and place those tokens onto the token bus ring 160. If a link token is provided to the round-robin arbiter 260, then that link token automatically gets prioritized over the other tokens and is placed onto the token ring bus 160.

It is noted that FIG. 2 is intended to depict the major representative components of a command token dispenser agent 200. In some embodiments, however, individual components may have greater or lesser complexity than as represented in FIG. 2, components other than or in addition to those shown in FIG. 2 may be present, and the number, type, and configuration of such components may vary.

Figure 3:
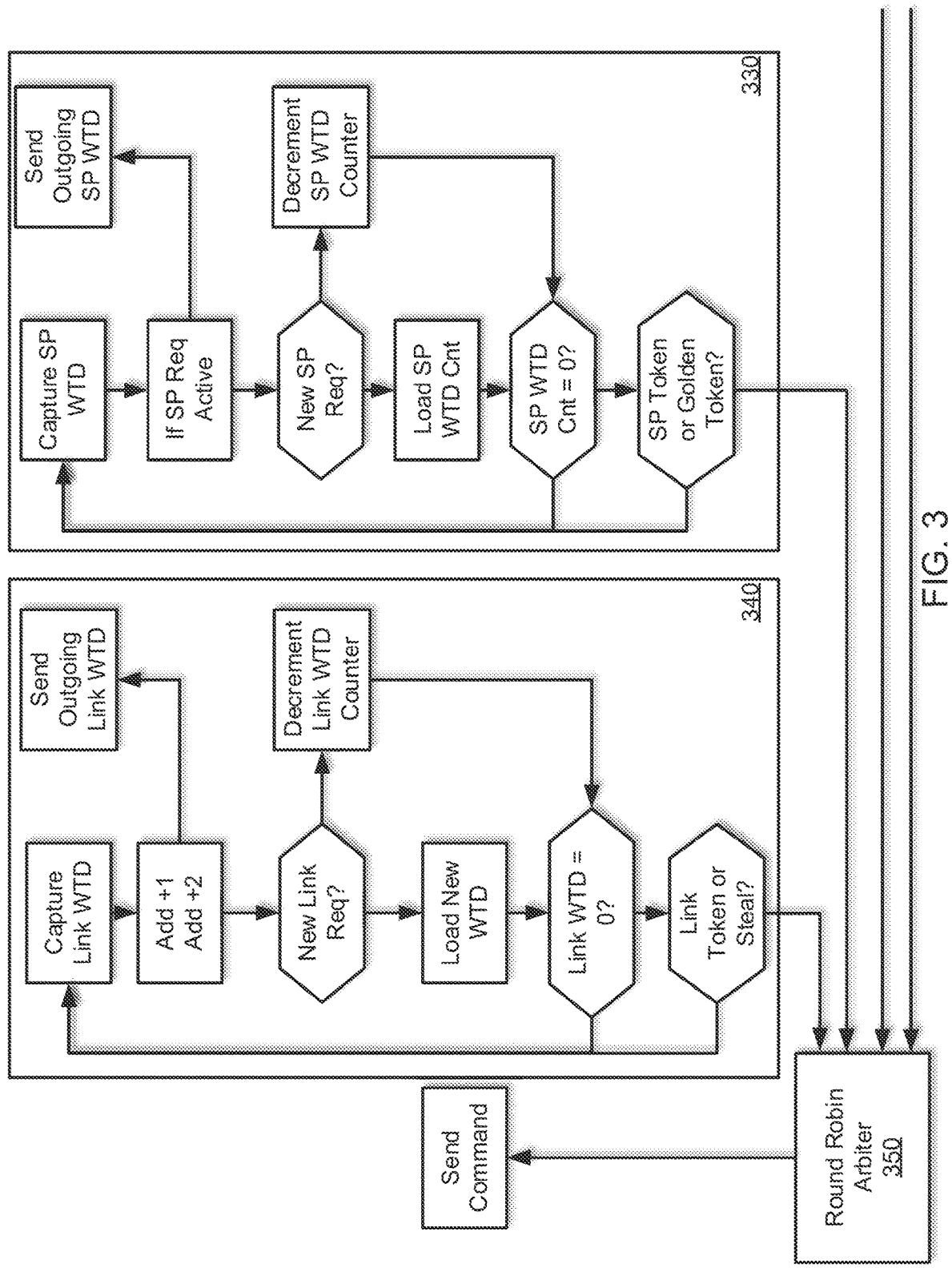
FIGS. 3 and 4 are block diagrams illustrating a node station agent and used by one or more embodiments of the present disclosure.
Figure 4:
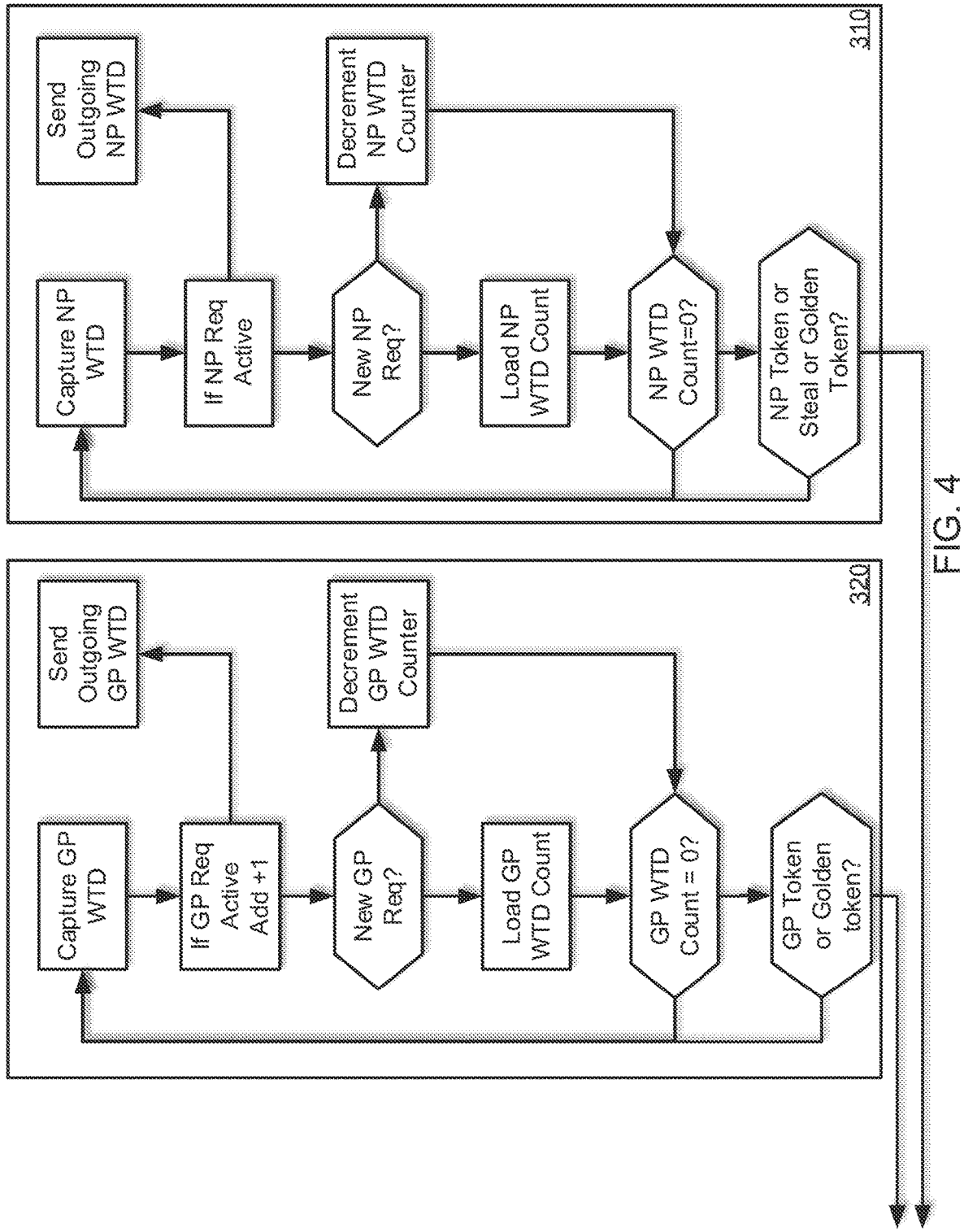

FIGS. 3 and 4 are block diagrams illustrating a node station agent 300 (which can be the same as, or substantially similar to, the node station agent 110 of FIG. 1) configured to perform operations, in accordance with embodiments of the present disclosure. The node station agent 300 includes a node workload agent 310, a group workload agent 320, a system workload agent 330, a link workload agent, and a round robin arbiter 350.

The node workload agent 310 is a component of the node station agent 300 configured to monitor and capture node workload vectors passing through the node station agent 300. The node workload vector can be used to determine when the node station agent 300 can take another node token off the token ring bus 160. The node workload agent 310 is further configured to place its own group workload onto the group workload vector on the control ring bus 150.

A node workload agent 310 can capture an incoming node workload vector from the control ring 150 and adds its own workload before transmitting the new workload vector downstream on control ring 150. The node workload agent 310 can add +1 to the vector or +2 if attached to communication ports 120. Concurrently, the node workload agent 310 can service command requests from its attached devices. When there is a new request, the node workload agent 310 can load the current workload vector for that scope into a counter. When the node workload agent 310 places the command on the command ring 140, it will decrement the workload vector count every time a token of the same scope is observed on token ring 160. When the workload vector (WTD) counter reaches zero, it is allowed to send another command of the same scope.

The group workload agent 320 is a component of the node station agent 300 configured to monitor and capture group workload vectors passing through the node station agent 300. The group workload vector can be used to determine when the node station agent 300 can take another group token off the token ring bus 160 to send a command of that scope. The group workload agent 320 is further configured to place its own group workload onto the group workload vector on the control ring bus 150.

A group workload agent 320 can capture an incoming group workload vector from the control ring 150 and adds its own workload before transmitting the new workload vector downstream on control ring 150. The group workload agent 320 can add +1 to the vector or +2 if attached to communication ports 120. Concurrently, the group workload agent 320 can service command requests from its attached devices. When there is a new request, the group workload agent 320 can load the current workload vector for that scope into a counter. When the group workload agent 320 places the command on the command ring 140, it will decrement the workload vector count every time a token of the same scope is observed on token ring 160. When the workload vector (WTD) counter reaches zero, it can send another command of the same scope.

The system workload agent 330 is a component of the node station agent 300 configured to monitor and capture system workload vectors passing through the node station agent 300. The system workload vector can be used to determine when the node station agent 300 can take another system token off the token ring bus 160 to send a command of that scope. The group workload agent 320 is further configured to place its own system workload onto the system workload vector on the control ring bus 150.

A system workload agent 330 can capture an incoming system workload vector from the control ring 150 and adds its own workload before transmitting the new workload vector downstream on control ring 150. The system workload agent 320 can add +1 to the vector or +2 if attached to communication ports 120. Concurrently, the system workload agent 320 can service command requests from its attached devices. When there is a new request, the system workload agent 330 can load the current workload vector for that scope into a counter. When the system workload agent 330 places the command on the command ring 140, it will decrement the workload vector count every time a token of the same scope is observed on token ring 160. When the workload vector (WTD) counter reaches zero, it can send another command of the same scope.

The link workload agent 340 is a component of the node station agent 300 configured to monitor and capture link workload vectors passing through the node station agent 300. The link workload vector can be used to determine when the node station agent 300 can take another group token off the token ring bus 160 to send a command of that scope. The link workload agent 320 is further configured to place its own link workload onto the link workload vector on the control ring bus 150.

A link workload agent 340 can capture an incoming link workload vector from the control ring 150 and adds its own workload before transmitting the new workload vector downstream on control ring 150. The link workload agent 340 can add +1 to the vector or +2 if attached to communication ports 120. Concurrently, the link workload agent 340 can service command requests from its attached devices. When there is a new request, the link workload agent 340 can load the current workload vector for that scope into a counter. When the link workload agent 340 places the command on the command ring 140, it will decrement the workload vector count every time a token of the same scope is observed on token ring 160. When the workload vector (WTD) counter reaches zero, it can send another command of the same scope.

The round-robin arbiter 350 is a component of the node station agent 300 configured to load commands onto the command bus 140. The round-robin arbiter 350 can allocate commands based on their scope and the distribution on the command ring 140. The arbiter 350 can give priority to commands of a certain scope that are being sent to the round-robin arbiter 350 at a higher frequency. For example, a node command with a higher frequency transmission than other commands can possibly indicate a higher workload of that scope. Those commands can be given priority when allocating commands onto the command ring 140. If a link token is included in the command, then that command takes precedence over the other commands and is given priority when being placed on the command ring 140.

It is noted that FIGS. 3 and 4 are intended to depict the major representative components of a node station agent 300. In some embodiments, however, individual components may have greater or lesser complexity than as represented in FIGS. 3 and 4, components other than or in addition to those shown in FIGS. 3 and 4 may be present, and the number, type, and configuration of such components may vary.

Figure 5:
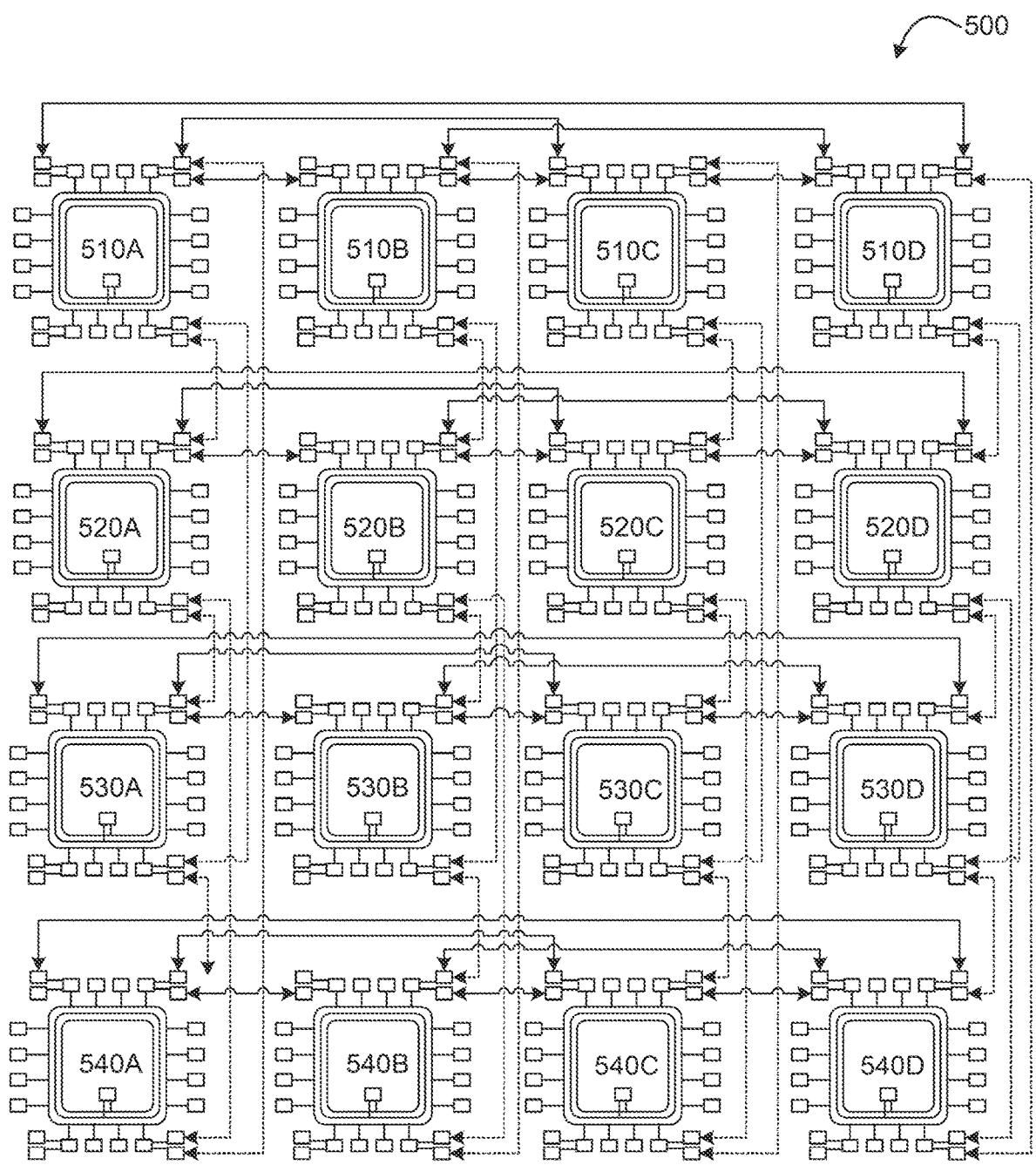
FIG. 5 is a block diagram illustrating a multi-chip topology of a symmetric multiprocessor and used by one or more embodiments of the present disclosure.

FIG. 5 is a block diagram illustrating a multi-chip topology 500 in a tiered format, in accordance with embodiments of the present disclosure. The multi-chip topology 500 includes a first group 510 of multi-processing nodes 510A-510D, a second group 520 of multi-processing nodes 520A-520D, a third group 530 of multi-processing nodes 530A-530D, and a fourth group 540 of multi-processing nodes 540A-540D.

Broadcast of a command solely within a multi-processing node can be viewed as tier 0 broadcast and would require a node token to issue the command. A broadcast of a command within a group (e.g., group 510, 520, 530, 540) can be viewed as a tier 1 broadcast and would require a group token to issue the command. For example, if a group command is issued from multi-processing node 520A, that command would be broadcast within group 520 because the processing node 520A is in group 520. Broadcasts of a command within the entire system can be viewed as a tier 2 broadcast and would require a system token to issue the command.

Each of the multi-processing nodes is interconnected to other multi-processing nodes 510-540 through their communication ports. The communication ports include links that interconnect the multi-processing nodes by group 510-540 as well as to the different groups 510-540. For example, the multi-processing node 510A includes at least five communication ports. Three communication ports are used to interconnect the multi-processing node 510A to its group via a connection with multi-processing node 510B-510D. Another communication port can be used to connect the multi-processing node 510A with group 520, another communication port with group 530, and another communication port with group 540. The interconnection with the other groups can be seen as tier 2 communication.

Figure 6:
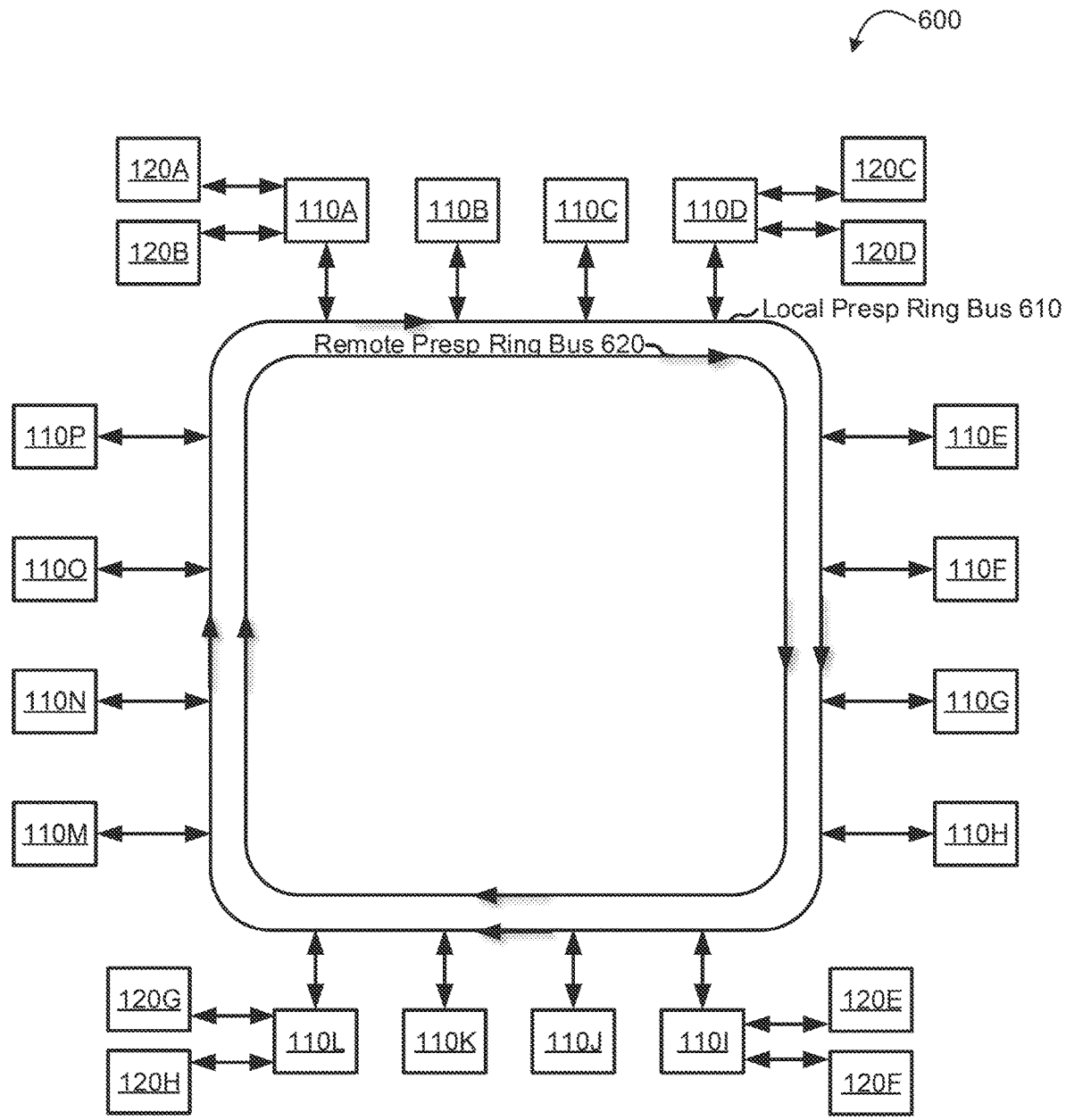
FIG. 6 is a block diagram illustrating a partial response network of a multi-processing node and used by one or more embodiments of the present disclosure.

FIG. 6 illustrates a partial response network 100 for a multi-processing node configured to transport partial responses to a destination, in accordance with embodiments of the present disclosure. The coherency command network 600 include node station agents 110A-110P, communication ports 120A-120H, a local partial response ring bus 610, and a remote partial response ring bus 620. When reference is made to a component and its associated number, such as node station agent 110, that reference may refer to any of the components with that associated number, such as node station agents 110A-110P, with or without an additionally associated letter. The partial response network 600 is configured in a circular topology interconnecting the node station agents 110 to the local partial response ring bus 610 and the remote partial response ring bus 620. The node station agent 110A is coupled to communication ports 120A and 120B. The node station agent 110D is coupled to communication ports 120C and 120D. The node station agent 110I is coupled to communication ports 120E and 120F. The node station agent 110L is coupled to communication ports 120G and 120H. It should be noted that although the embodiment of FIG. 6 includes 2 buses 610 and 620, a greater number of buses can be included, as desired. Additionally, while only sixteen node station agents 110 are shown, a greater or lesser number of node station agents 110 can also be used.

The node station agents 110 and the communication ports 120 are the same as, or substantially similar, to the node stations 110 and the communication ports 120 as illustrated in FIG. 1 and described above. The local partial response ring bus 610 is a component of the partial response network 600 configured to transport partial responses. The partial responses can be returned within a fixed amount of time after snooping of a command. The partial responses can propagate through the local partial response ring bus 610 until it reaches its intended destination. The node station agent 110 that issued the command can collect the partial response, thereby terminating the transmission.

The remote partial response ring bus 620 is a component of the partial response network 600 configured to transport partial responses of commands not originating on the multi-processing node. A node station agent can place a remote partial response onto the remote partial response ring bus 620, where it can then propagate to a communication port 120. In some embodiments, the communication ports 120 include internal partial response queues. The partial response queues can collect all the partial responses generated locally by the node station agents 110. Once collected, the communication port 120 collecting the partial responses can forward the partial responses back to the node station agent 110 that originated the command.

The partial response network 600 is configured such that the local partial response ring bus 610 follows a fixed number of cycles after the address of the node station agents 110. As such, the node station agents 110 do not require a mechanism that allows the node stations agents 110 onto the local partial response ring bus 610. Each node station agent 110 is guaranteed a slot to place a partial response after a fixed number of cycles.

It is noted that FIG. 6 is intended to depict the major representative components of a partial response network 600. In some embodiments, however, individual components may have greater or lesser complexity than as represented in FIG. 6, components other than or in addition to those shown in FIG. 6 may be present, and the number, type, and configuration of such components may vary. It should be noted that the components on the partial response network 600 can be duplicated multiple times (e.g., four times) to provide enough capacity for traffic. Once duplicated, the direction of the buses alternates between the various duplications.

Figure 7:
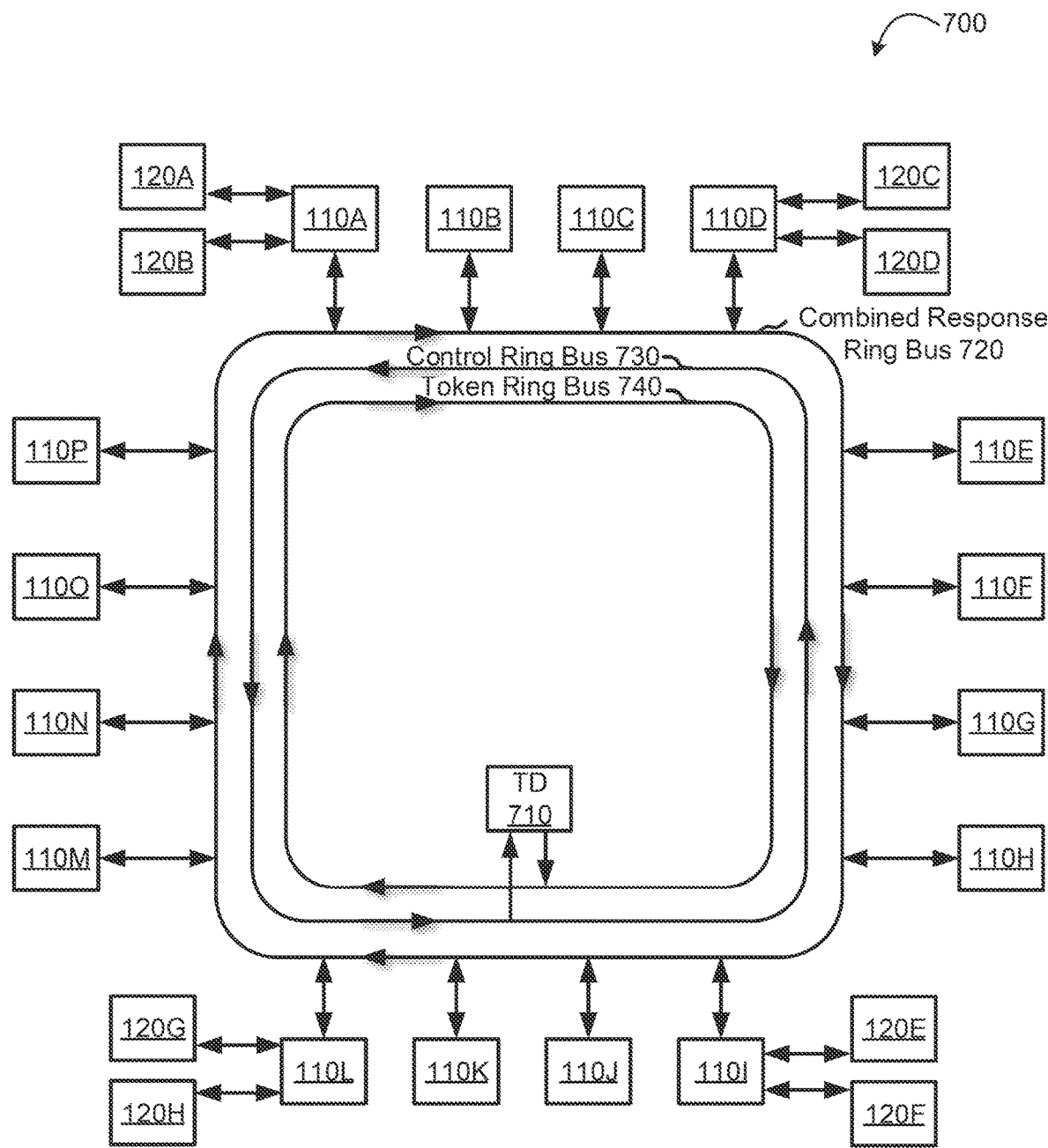
FIG. 7 is a block diagram illustrating a combined response network of a multi-processing node and used by one or more embodiments of the present disclosure.

FIG. 7 illustrates a combined response network 700 for a multi-processing node configured to manage responses, in accordance with embodiments of the present disclosure. The combined response network 700 include node station agents 110A-110P, communication ports 120A-120H, a combined response token dispenser agent 710, a combined response ring bus 720, a control ring bus 730, and a token ring bus 740. When reference is made to a component and its associated number, such as node station agent 110, that reference may refer to any of the components with that associated number, such as node station agents 110A-110P, with or without an additionally associated letter. The combined response network 700 is configured in a circular topology interconnecting the node station agents 110 to the combined response ring bus 720, the control ring bus 730, and the token ring bus 740. The node station agent 110A is coupled to communication ports 120A and 120B. The node station agent 110D is coupled to communication ports 120C and 120D. The node station agent 110I is coupled to communication ports 120E and 120F. The node station agent 110L is coupled to communication ports 120G and 120H. It should be noted that although the embodiment of FIG. 7 includes three buses 720, 730, and 740, a greater number of buses can be included, as desired. Additionally, while only sixteen node station agents 110 are shown, a greater or lesser number of node station agents 110 can also be used.

The node station agents 110 and the communication ports 120 are the same as, or substantially similar to, the node stations 110 and the communication ports 120 as illustrated in FIG. 1 and described above. The combined response token dispenser agent 710 is a component of the multi-processing node on the combined response network 700 configured to supply tokens onto the token ring bus 740. The combined response token dispenser agent 710 issues different types of tokens that are placed onto the token ring bus 740. The different types of tokens include a group token, a system token, a remote hub token, and a remote leaf token. Local responses do not require a token to be placed onto the combined response ring bus 710 as it they are handled similarly to the partial response network 600, where local partial responses are guaranteed a slot after a certain number of cycles after the command was issued.

These tokens provide responses with their propagation scope and the authority to be placed onto the combined response ring bus 720. Group tokens allow responses to propagate to other multi-processing nodes in the same group. System tokens allow responses to propagate to an entire interconnected network of multi-processing nodes. The remote hub tokens allow combined responses coming from other multi-processing nodes within the group to propagate through the combined response ring bus 720. The remote leaf tokens allow combined responses coming from other multi-processing nodes within the system or leaf to propagate through the combined response ring bus 720.

The combined response token dispenser agent 710 is further configured to dynamically adjust the mixture of available tokens on the token ring bus 720. The combined response token dispenser agent 710 can adjust the type of available tokens based on a link demand. For example, the combined response token dispenser agent 710 can reduce the number of group tokens and system tokens when the number of remote leaf tokens and remote hub tokens exceeds a threshold. By reducing those tokens, the combined response token dispenser agent 710 allows remote traffic to pass through the combined response network 700. Additional details concerning the combined response token dispenser agent 710 can be found below in reference to FIG. 9.

Figure 8:
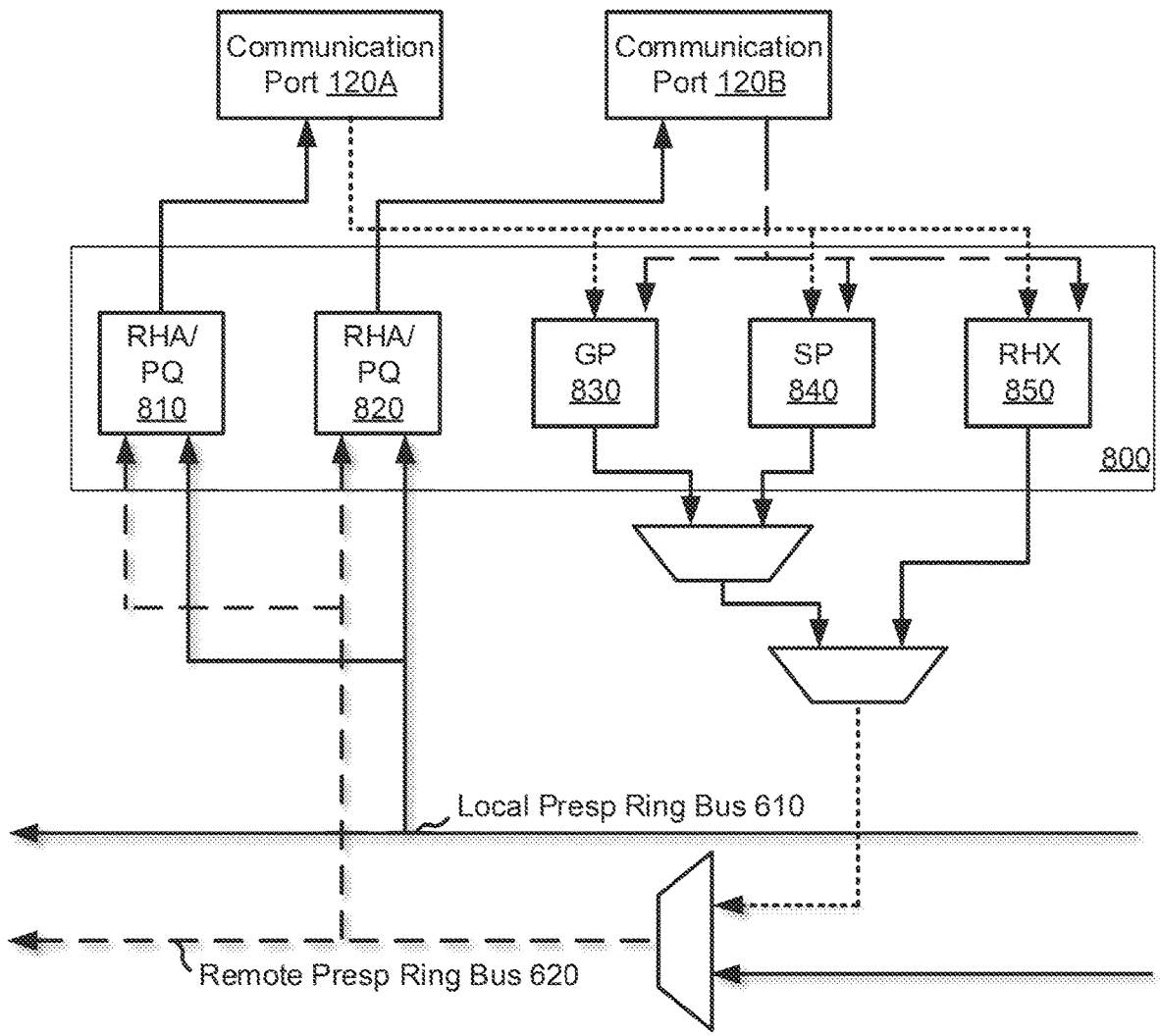
FIG. 8 is a block diagram illustrating a partial response linking structure and used by one or more embodiments of the present disclosure.

FIG. 8 is a block diagram illustrating a partial response queue 800 configured to collect partial responses from different sources, in accordance with embodiments of the present disclosure. The partial response queue includes remote hub queues 810, 810, a group queue 830, a system queue 840, and an RHX queue 850. The communication ports 120A and 120B are configured with an A-bus and an X-bus for routing information across the interconnection network.

The remote partial response ring bus 620 is used for the external group (Tier 1) and system (Tier 2) inbound partial responses. Those external responses are routed to the group queue 830 and system queue 840. Both the group queue 830 and system queue 840 can store partial responses with a first-in-first-out configuration. There is no partial response storage for the external Tier1 inbound links. A remote hub partial response queue is required to gather X-bus partial responses for Tier2 broadcast commands for outbound A-bus partial response queues 810 and 820. The multi-hop coherency collects partial responses at the chip Link Quadrants in RHX 850, GP 830, and SP 850 partial response structure and forwards the collected partial responses to the local master.

Figure 9:
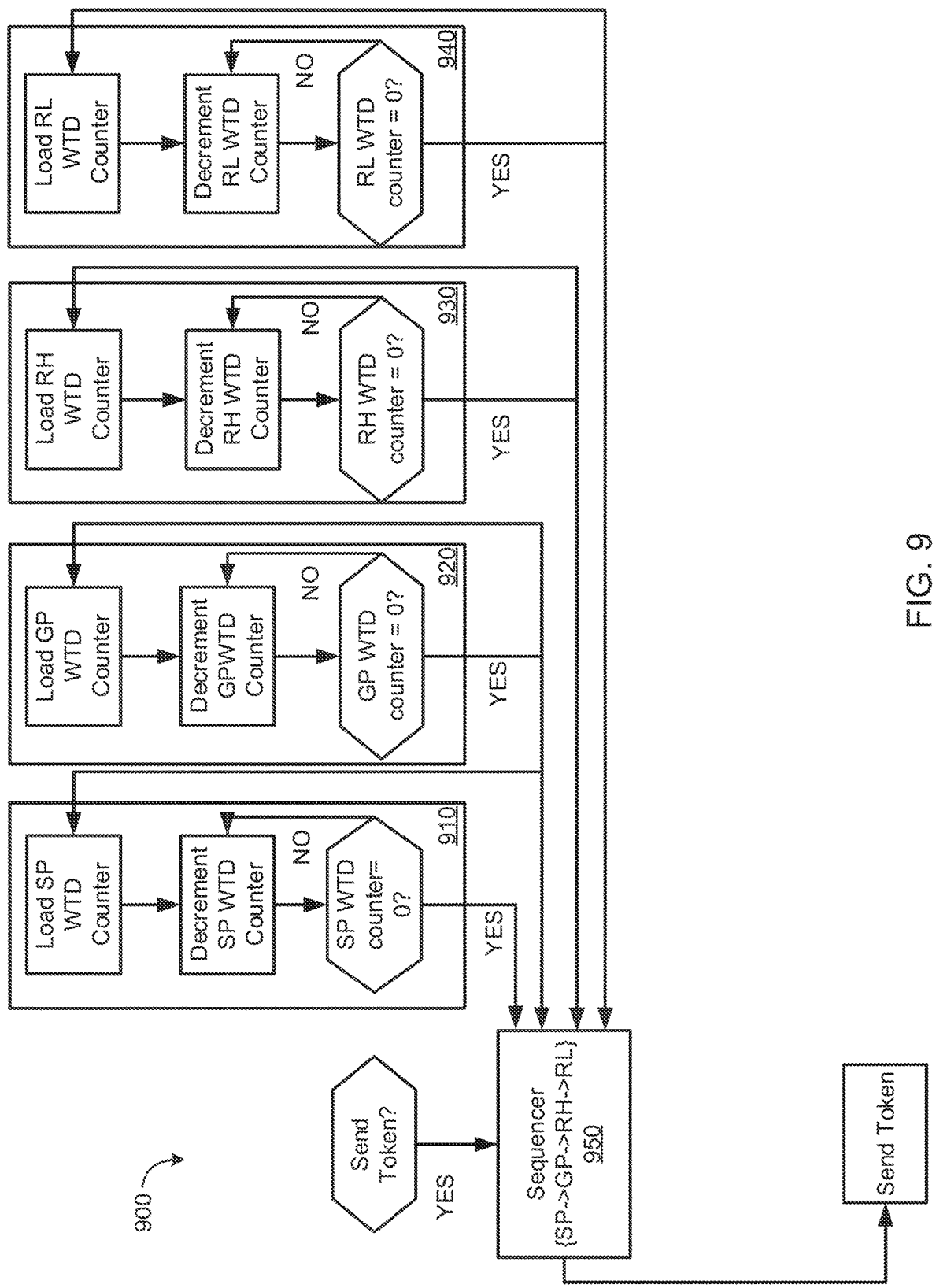
FIG. 9 is a block diagram illustrating a combined response token dispenser agent and used by one or more embodiments of the present disclosure.

FIG. 9 is a block diagram illustrating a combined response token dispenser agent 900 (which can be the same as, or substantially similar to, the combined response token dispenser agent 710 of FIG. 7) configured to allocate tokens onto the token ring bus 740, in accordance with embodiments of the present disclosure. The combined response token dispenser agent 900 includes a system token dispenser 910, a group token dispenser 920, a remote hub token dispenser 930, a remote leaf token dispenser 940, and a sequencer 950.

The system token dispenser 910 is a component of the combined response token dispenser agent 900 configured dispense a system token to the sequencer 950. System tokens allow responses to propagate to other multi-processing nodes in an entire interconnection network. The system token dispenser 910 loads a system workload counter that determines the rate at which a system token is dispensed. The system workload counter can be based on a rate of the remote hub or remote leaf workload propagating through the multi-processing node. In some embodiments, the combined response token dispenser agent 900 dynamically changes the system workload counter to adjust the frequency of system token distribution. For example, a higher system workload counter can decrease the frequency of the system token distribution, whereas a lower system workload counter can increase the frequency of the system token distribution.

Once loaded, the system token dispenser 910 can decrement the system token workload counter. The system workload counter can be analyzed to determine whether or not the system workload counter is equal to zero. If the system workload counter is not zero, then the system token dispenser 910 can continue to decrement the system workload counter at an interval. However, if the group launch rate counter is zero, then the system token dispenser 910 can send a system token to the sequencer 950.

The group token dispenser 920 is a component of the combined response token dispenser agent 900 configured to dispense a group token to the sequencer 950. Group tokens allow responses to propagate to other multi-processing nodes in the same group. The group token dispenser 920 loads a group workload counter that determines the rate at which a group token is dispensed. The group launch rate counter can be based on the percentage of distribution of tokens on the token ring bus 740. In some embodiments, the combined response token dispenser agent 900 dynamically changes the group workload counter to adjust the frequency of group token distribution. For example, a higher group workload counter can decrease the frequency of the group token distribution, whereas a lower group workload counter can increase the frequency of the group token distribution.

Once loaded, the group token dispenser 920 can decrement the group workload rate counter. The group workload counter can be analyzed to determine whether the count is equal to zero. If the group workload counter is not zero, then the group token dispenser 920 can continue to decrement the group workload counter at an interval. However, if the group workload counter is zero, then the group token dispenser 920 can send a group token to the sequencer 950.

The remote hub token dispenser 930 is a component of the combined response token dispenser agent 900 configured to dispense a remote hub token to the sequencer 950. Remote hub tokens allow responses to propagate to other multi-processing nodes in the same group. The remote hub token dispenser 930 loads a remote hub workload counter that determines the rate at which a remote hub token is dispensed. The remote hub workload counter can be based on the percentage of distribution of tokens on the token ring bus 740. Once loaded, the remote hub token dispenser 930 can decrement the remote hub workload rate counter. The remote hub workload counter can be analyzed to determine whether the count is equal to zero. If the remote hub workload counter is not zero, then the remote hub token dispenser 930 can continue to decrement the remote hub workload counter at an interval. However, if the remote hub workload counter is zero, then the remote hub token dispenser 930 can send a remote hub token to the sequencer 950.

The remote link token dispenser 940 is a component of the combined response token dispenser agent 900 configured dispense a remote link token to the sequencer 950. Remote link tokens allow responses to propagate to other multi-processing nodes in the system. The remote link token dispenser 940 loads a remote link workload counter that determines the rate at which a remote link token is dispensed. The remote link workload counter can be based on the percentage of distribution of tokens on the token ring bus 740. Once loaded, the remote link token dispenser 940 can decrement the remote link workload rate counter. The remote link workload counter can be analyzed to determine whether the count is equal to zero. If the remote link workload counter is not zero, then the remote link token dispenser 940 can continue to decrement the remote link workload counter at an interval. However, if the remote link workload counter is zero, then the remote link token dispenser 940 can send a remote link token to the sequencer 950.

The sequencer 950 is a component of the command token dispenser agent 200 configured to load tokens onto the token ring bus 160. The sequencer 950 manages the distribution of tokens onto the token ring bus 740. The sequencer 950 can distribute tokens of each scope using the workload count as the initial value. It will issue each scope token until the workload count reaches zero before advancing to the next scope token. It can sequence through all scopes before repeating the sequence of system token, group token, remote hub token, and remote leaf token.

It is noted that FIG. 9 is intended to depict the major representative components of a combined response token dispenser agent 900. In some embodiments, however, individual components may have greater or lesser complexity than as represented in FIG. 9, components other than or in addition to those shown in FIG. 9 may be present, and the number, type, and configuration of such components may vary.

Figure 10:
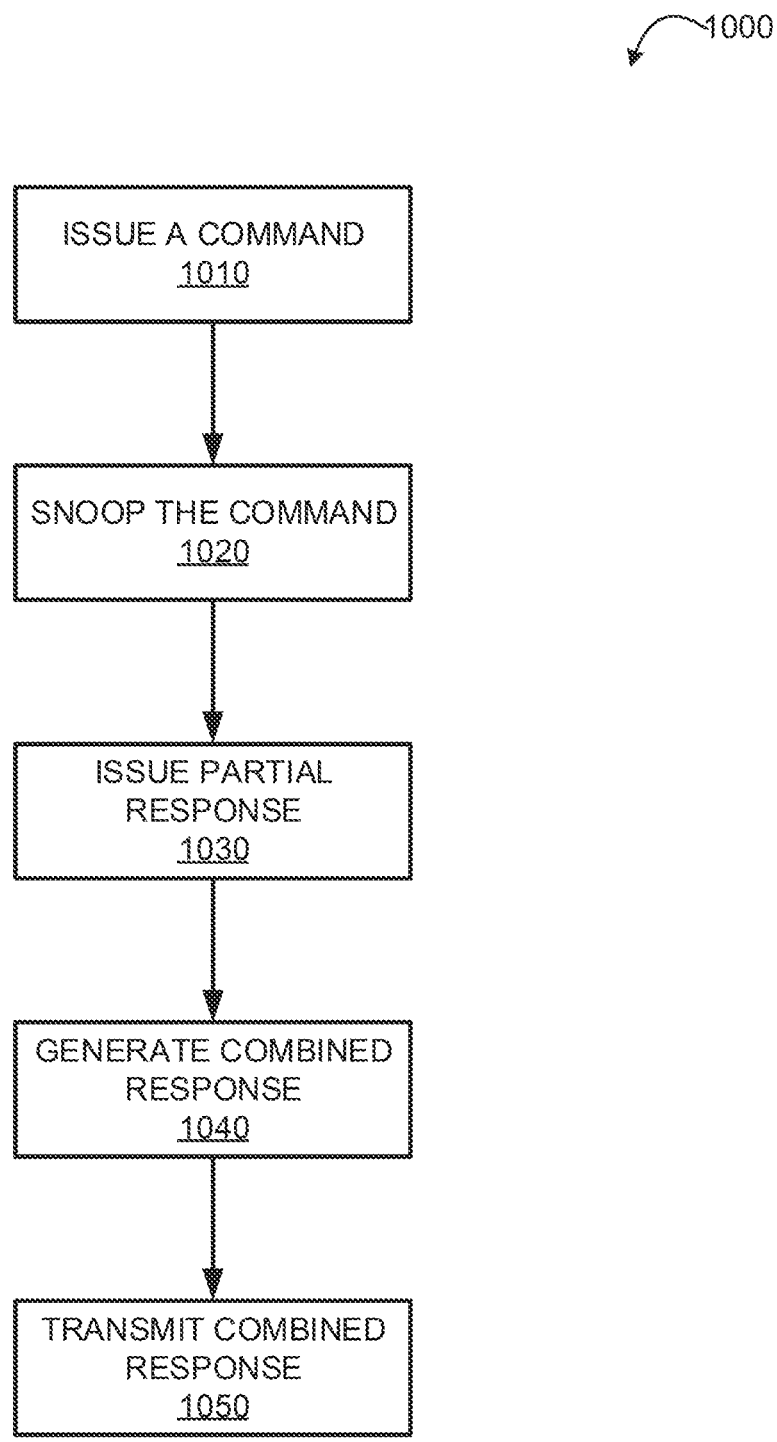
FIG. 10 is a block diagram illustrating an end-to-end coherency flow between multi-processing nodes.

FIG. 10 is a flow diagram illustrating a process 1000 of processing a command through a hierarchical ring-based interconnection network of a symmetric multiprocessor, in accordance with embodiments of the present disclosure. The process 1000 may be performed by hardware, firmware, software executing on a processor, or a combination thereof. For example, any or all the steps of the process 1000 may be performed by one or more processors embedded in a computing device. A node station agent 110 issues a command from within a multi-processing node. This is illustrated at step 1010. In order to issue the command, the node station agent 110 obtains a token of the appropriate scope for the command. The different types of tokens include a node token, a group token, a system token, and a link token.

Once obtained, the command can propagate through the interconnection network based on the scope of the token. For example, a node station agent 110 can obtain a group token off of the token ring bus 160 and issue a command to the group of multi-processing nodes that the current multi-processing node is in. The node station agents 110 within the scope of the token snoop the command. This is illustrated at step 1020. The other node station agents 110 within that scope can snoop the command so that they can issue partial responses for the command. This is illustrated at step 1030. The partial responses can propagate back to the node station agent 110 that originate the command. During propagation, the node station agents 110 generate combined response as the partial responses propagate through the agents 110. This is illustrated at step 1030. The combined responses are then sent back to the node station agent. This is illustrated at step 1040.

Figure 11:
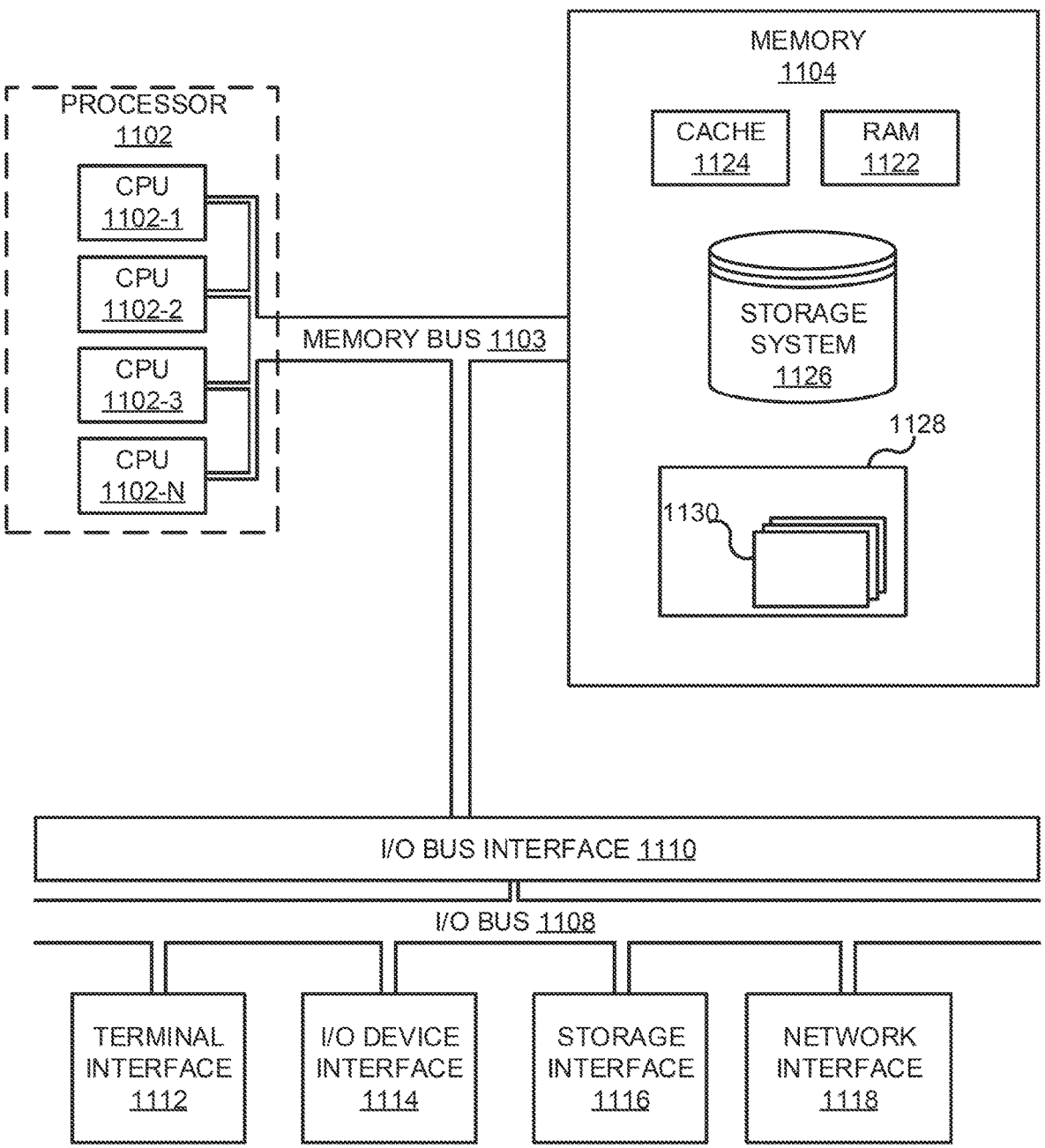
FIG. 11 is a high-level block diagram illustrating an example computer system that may be used in implementing one or more of the methods, tools, and modules, and any related functions, described herein in which the disclosure may be implemented.

Referring now to FIG. 11, shown is a high-level block diagram of an example computer system 1100 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1100 may comprise one or more processors 1102, a memory 1104, a terminal interface 1112, an I/O (Input/Output) device interface 1114, a storage interface 1116, and a network interface 1118, all of which may be communicatively coupled, directly or indirectly, for inter-component communication via a memory bus 1103, an I/O bus 1108, and an I/O bus interface 1110.

The computer system 1100 may contain one or more general-purpose programmable central processing units (CPUs) 1102-1, 1102-2, 1102-3, and 1102-N, herein generically referred to as the processor 1102. In some embodiments, the computer system 1100 may contain multiple processors typical of a relatively large system; however, in other embodiments, the computer system 1100 may alternatively be a single CPU system. Each processor 1102 may execute instructions stored in the memory 1104 and may include one or more levels of onboard cache.

The memory 1104 may include computer system readable media in the form of volatile memory, such as random-access memory (RAM) 1122 or cache memory 1124. Computer system 1100 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 1104 can include flash memory, e.g., a flash memory stick drive or a flash drive.

Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 11 as a single bus structure providing a direct communication path among the processors 1102, the memory 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1100 may, in some embodiments, contain multiple I/O bus interface units, multiple I/O buses, or both. Further, while multiple I/O interface units are shown, which separate the I/O bus 1108 from various communications paths running to the various I/O devices, in other embodiments, some or all of the I/O devices may be connected directly to one or more system I/O buses.

In some embodiments, the computer system 1100 may be a multi-user mainframe computer system, a single-user system, or a server computer or similar device that has little or no direct user interface but receives requests from other computer systems (clients). Further, in some embodiments, the computer system 1100 may be implemented as a desktop computer, portable computer, laptop or notebook computer, tablet computer, pocket computer, telephone, smartphone, network switches or routers, or any other appropriate type of electronic device.

It is noted that FIG. 11 is intended to depict the major representative components of an exemplary computer system 1100. In some embodiments, however, individual components may have greater or lesser complexity than as represented in FIG. 11, components other than or in addition to those shown in FIG. 11 may be present, and the number, type, and configuration of such components may vary.

One or more programs/utilities 1128, each having at least one set of program modules 1130 (e.g., the process processing a command through a hierarchical ring-based interconnection network of a symmetric multiprocessor 1000), may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of allocating tokens onto a token ring bus, comprising:
   dispensing a node token to a round robin arbiter by:
     loading a node token launch rate counter;
     decrementing the node token launch rate counter at an interval;
     determining that a value for the node token launch rate counter is zero; and
     in response to the node token launch rate being zero, sending a node token to the round robin arbiter;
   dispensing a group token to the round robin arbiter by:
     loading a group token launch rate counter;
     decrementing the group token launch rate counter at a second interval;
     determining that a value for the group token launch rate counter is zero; and
     in response to the group token launch rate being zero, sending a group token to the round robin arbiter;
   dispensing a system token to the round robin arbiter by:
     loading a system token launch rate counter;
     decrementing the system token launch rate counter at a third interval;
     determining that a value for the system token launch rate counter is zero; and
     in response to the group token launch rate being zero, sending a system token to the round robin arbiter;
   dispensing a link token to the round robin arbiter at a predetermined interval; and
   loading, by the round robin arbiter, the node token, the system token, the group token and the link token onto the token ring bus based on allocation, need and configuration of a command token dispenser agent.

2. The method of claim 1 further comprising:
   when a link token is dispensed to the round robin arbiter, prioritizing the link token over the node, group and system tokens.

3. The method of claim 1 further comprising:
   dispensing a golden token to the round robin arbiter; and
   loading the golden token onto the token ring bus.

4. The method of claim 1 further comprising:
   determining that the token ring bus is empty of tokens; and
   issuing a golden token directly to the token ring bus, bypassing the round robin arbiter.

5. The method of claim 1 further comprising:
   determining that there are no requests for a group token, a system token or a link token by a node station agent; and
   in response to determining that there are no requests, issuing the node token to the round robin arbiter prior to the node token launch rate counter reaching zero.

6. The method of claim 1 further comprising:
   determining that there are no requests for a node token, a system token or a link token by a node station agent; and
   in response to determining that there are no requests, issuing the group token to the round robin arbiter prior to the group token launch rate counter reaching zero.

7. The method of claim 1 further comprising:
   determining that there are no requests for a node token, a group token or a link token by a node station agent; and
   in response to determining that there are no requests, issuing the system token to the round robin arbiter prior to the node token launch rate counter reaching zero.

8. The method of claim 1
   dynamically changing the node token launch rate counter, the group token launch rate counter, and the system token launch rate counter based upon which tokens are being taken off the token ring bus.

9. A method of processing a command on symmetric multiprocessor having a hierarchical ring-based interconnection network, the method comprising:
   issuing a command from a node station agent on a multi-processing node and configured in a ring-based interconnection network of the symmetric multiprocessor, wherein the command includes a token providing a scope of the command;
   snooping the command by other node station agents on the interconnection network that match the scope of the command;
   issuing partial responses to the command by the other node station agents after a fixed period of time;
   generating, by the multi-processing node, a combined response by compiling the partial responses issued by the other node station agents; and
   transmitting the combined response to the node station agent that issued the command.

10. The method of claim 9 further comprising:
    propagating the partial responses through a local partial response ring.

* * * * *